UNITED STATES PATENT OFFICE.

HANS GESELL, OF MONTCLAIR, NEW JERSEY.

METHOD OF COATING PAPER AND ARTICLES PRODUCED THEREBY.

1,277,904.   Specification of Letters Patent.   Patented Sept. 3, 1918.

No Drawing.   Application filed February 15, 1915.   Serial No. 8,243.

*To all whom it may concern:*

Be it known that I, HANS GESELL, a citizen of the United States, residing in Montclair, county of Essex, and State of New Jersey, have invented certain new and useful Improvements Relating to the Methods of Coating Paper and Articles Produced Thereby, of which the following is a specification.

The invention relates to the coating of paper and similar material.

According to my invention paper, preferably when in the form of a web or strip, is provided with a coating that comprises a condensation product made from phenol or its equivalent, and formaldehyde or its equivalent; or in other words, a homogeneous infusible resinous product derived from a fusible condensation product of an organic compound containing alcoholic hydroxyl groups.

It is well known that phenol or any one or more of its equivalents reacts with formaldehyde or any one or more of its equivalents to form a hard fusible product which is frequently referred to as a hard fusible phenol resin.

According to one phase of my invention said resinous product, be it a phenol resin or some other fusible resin, is dissolved in any one of, or a mixture of, the following solvents; for example, ether, ethlybromid, alcohol, wood alcohol, acetic ether, amylacetate, benzol, chloroform, acetone, petroleum-ether, nitrobenzol, paratoluidin, phenol, pyridin, carbon-bisulfid, carbon-tetrachlorid, toluol, xylol. The resulting solution is applied to the paper in any suitable manner so as to coat the latter and thereafter the coated paper is dried, as by heat, so as to leave upon the paper an ultimate infusible and insoluble resin.

Paper having a coating of such an ultimate infusible and insoluble condensation product has a comparatively hard surface, is rendered transparent by the treatment, and also has sufficient flexibility,—which flexibilty, however, is more or less dependent upon the thickness of the paper to which the coating is applied as well as upon the thickness of the coating which is thus applied. The coating thus described, as indicated by its name, is not softened by heat and since it is not soluble it is not affected by moisture or liquids. The paper thus coated has certain requisite characteristics which enable it to be used in many places; for example, as a substitute for thin sheets of celluloid and also in many places where the common waxed paper is used to-day.

In many instances it has been desired to provide a "waxed" paper that would be provided with a coating which would have a melting point higher than that of the coating of the "waxed" papers which have been produced up to the present time. By having the resulting coating comprise a "mixture," so to speak, of wax or its equivalent and the ultimate infusible and insoluble condensation product above described— that is, with the condensation product of phenol or its equivalent and formaldehyde or its equivalent—"waxed" paper can be produced which will have the desired degree of flexibility or stiffness, and have a higher melting point.

A method of producing such a "waxed" paper comprises the placing of wax or waxes, such as any of the mineral waxes, paraffin or ceresin, for example, and a fusible resin, as a phenol resin, in a common solvent—be such solvent easily volatile or non-volatile—and applying the resulting solution to the paper to be coated. Some of the solvents which may be used for this purpose are the following: ether, ethylbromid, alcohol, wood alcohol, acetic ether, amylacetate, benzol, chloroform, acetone, petroleum ether, nitrobenzol, paratoluidin, phenol, pyridin, carbon-bisulfid, carbon-tetrachlorid, toluol, xylol. Whether or not any one or more of the above solvents may be utilized as a common solvent manifestly depends upon the particular wax or waxes used and also upon the particular resin which is used.

After the paper is thus coated it is dried in any suitable manner and heat may be used, if found necessary, to assist in changing the resin into an ultimate infusible and insoluble product, as desired. When the paper is coated in this manner an ultimate infusible and insoluble product (or products) will be formed thereupon. There will be "mixed" with the ultimate infusible and insoluble product (or products), the wax or waxes which were originally dissolved in the common solvent. The ultimate product and the wax or waxes thus "mixed" provide the coating of the paper. As above indicated, the resulting paper will have a melting point relatively higher than the ordinary "waxed" paper, but it should be noted that the resulting paper will also have a flexibility which is relatively greater than the paper which is coated merely with the ultimate infusible and insoluble condensation product, such as resulted from the method first described in this specification.

The resulting paper, the coating of which comprises the "mixed together" wax and ultimate infusible and insoluble condensation product above referred to, has a comparatively high degree of transparency, resists a comparatively high degree of heat and is not affected by moisture, nor to any material degree by ordinary liquids.

It will be manifest that ingredients, other than those above described, may be inserted in the liquid prior to providing the paper with coating, or that ingredients might be applied to the paper while the coating thereon is in a soft condition.

I believe, however, that I am the first to apply a resinous condensation product as from phenol or its equivalent and from formaldehyde or its equivalent as a coating to paper, or as an essential component in the coating applied to paper, and consider that my claims should be broadly construed. It is manifest that the invention herein described may be realized in many different ways and applied to many different paper products without departing from the spirit and scope of the invention, and that the invention may be applied to the coating of paper be it in sheet, strip, web or any other similar form, cloth, and webs of other products.

It will also be manifest that any coloring material can be added to the solution before it is applied to the paper or other article for the purpose of coating the same, and there may be added to the solution any inert materials which it is desired to have in the resulting coating that is applied to the article.

I claim as my invention—

1. A paper having a coating thereupon, which coating comprises paraffin or other mineral waxes having "mixed" therewith an ultimate resinous condensation product derived from a fusible condensation product of an organic compound containing alcoholic hydroxyl groups.

2. The method of treating paper which method comprises the dissolving, in a suitable solvent, of a wax such as paraffin and a fusible resin that is a condensation product, applying a coating of the resulting solution to paper and drying at a sufficient temperature the paper until the coating thereupon comprises an infusible and insoluble condensation product mixed with the wax.

3. An article of manufacture which is produced by the dissolving, in a suitable solvent, of a wax such as paraffin and a fusible condensation product, applying a coating of the resulting solution to paper and heating the paper until the condensation product thereupon has been changed into an ultimate infusible and insoluble condensation product.

4. A paper having a coating thereupon comprising a wax such as paraffin and a resinous condensation product or its equivalent.

5. A method which comprises the dissolving of a resinous condensation product and a wax, such as paraffin, in a suitable solvent, coating a paper or the like with the resulting solution and drying the paper thus coated, as with the application of heat, leaving the paper provided with a coating comprising wax and a resinous condensation product, the wax and the condensation product being mixed together in the coating.

6. A method which comprises the dissolving of a resinous condensation product and a mineral wax in a suitable solvent, also mixing therewith an inert material, such as color, subsequently applying the resulting solution or mixture to an article, then heating so as to leave upon the article a coating comprising an ultimate infusible and insoluble condensation product.

7. A method which comprises the dissolving of a resinous condensation product and a wax such as paraffin in a suitable solvent, also mixing therewith a suitable color or inert material, applying the mixture or solution to an article, and subsequently drying by the application of heat, sufficient in temperature to leave upon the article a coating comprising an ultimate infusible and insoluble condensation product.

8. A method which comprises the dissolving of a resinous condensation product and a wax, such as paraffin, in a suitable solvent, coating a paper or the like with the resulting solution and heating the paper thus coated in a manner so that there will be left upon the paper a coating that comprises wax and an ultimate infusible and insoluble resinous condensation product, the wax and said ultimate condensation product being mixed together in the coating.

9. A method which comprises the dissolving of a resinous condensation product and a mineral wax in a suitable solvent, subsequently applying the resulting solution or mixture to an article and heating in a manner to leave upon the article a coating comprising an ultimate infusible and insoluble condensation product.

10. A method which comprises the dissolving of a resinous condensation product and a wax, such as paraffin, in a suitable solvent, applying the mixture of solution to an article and subsequently drying by the application of heat which is sufficient in temperature to leave upon the article a coating which comprises an ultimate infusible and insoluble condensation product.

11. A paper having a transparent coating thereupon which transparent coating comprises paraffin or other mineral wax having mixed therewith an ultimate infusible and insoluble condensation product derived from a resinous fusible condensation product.

12. In the making of a paper transparent the method which comprises dissolving a fusible phenol resin in a suitable solvent, coating the paper with a resulting solution and heating until there is left upon the paper a coating which comprises an infusible and insoluble resinous condensation product.

This specification signed and witnessed this 11th day of February, A. D. 1915.

HANS GESELL.

Signed in the presence of—
EDWIN A. PACKARD,
M. F. KEATING.